United States Patent
Yuan et al.

(10) Patent No.: US 11,205,033 B2
(45) Date of Patent: Dec. 21, 2021

(54) METHOD, APPARATUS AND SYSTEM FOR WIDE METAL LINE FOR SADP ROUTING

(71) Applicant: GLOBALFOUNDRIES INC., Grand Cayman (KY)

(72) Inventors: Lei Yuan, Sunnyvale, CA (US); Juhan Kim, Sunnyvale, CA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 17/070,708

(22) Filed: Oct. 14, 2020

(65) Prior Publication Data

US 2021/0027005 A1 Jan. 28, 2021

Related U.S. Application Data

(63) Continuation of application No. 15/200,475, filed on Jul. 1, 2016, now Pat. No. 10,846,452.

(51) Int. Cl.
| | |
|---|---|
| *G06F 7/50* | (2006.01) |
| *G06F 30/392* | (2020.01) |
| *H01L 23/522* | (2006.01) |
| *H01L 23/528* | (2006.01) |
| *G06F 30/394* | (2020.01) |
| *G06F 119/06* | (2020.01) |

(52) U.S. Cl.
CPC .......... *G06F 30/392* (2020.01); *G06F 30/394* (2020.01); *H01L 23/528* (2013.01); *H01L 23/5226* (2013.01); *G06F 2119/06* (2020.01)

(58) Field of Classification Search
USPC ................. 716/119, 118, 126, 129
See application file for complete search history.

(56) References Cited

U.S. PATENT DOCUMENTS

| | | | | |
|---|---|---|---|---|
| 6,785,877 | B1* | 8/2004 | Kozai | G06F 30/39 716/127 |
| 7,919,793 | B2* | 4/2011 | Iwata | H01L 27/0207 257/206 |
| 2012/0249182 | A1 | 10/2012 | Sherlekar | |
| 2014/0282289 | A1* | 9/2014 | Hsu | G03F 1/70 716/51 |
| 2015/0213184 | A1* | 7/2015 | Yuan | G06F 30/394 716/129 |
| 2015/0286764 | A1* | 10/2015 | Yuan | G06F 30/392 716/55 |

(Continued)

OTHER PUBLICATIONS

Office Action dated Aug. 13, 2020 from co-pending U.S. Appl. No. 15/200,475.

(Continued)

*Primary Examiner* — Brian Ngo
(74) *Attorney, Agent, or Firm* — Williams Morgan, P.C.

(57) ABSTRACT

At least one method, apparatus and system disclosed involves a circuit layout for an integrated circuit device comprising a plurality of wider-than-default metal formations for a functional cell. A design for an integrated circuit device is received. The design comprises at least one functional cell. A first pair of wide metal formations are provided. The first pair of wide metal formations comprise a first metal formation and a second metal placed about a first cell boundary of the functional cell for providing additional space for routing, for high-drive routing, and/or for power routing.

20 Claims, 8 Drawing Sheets

(56) References Cited

U.S. PATENT DOCUMENTS

| | | | |
|---|---|---|---|
| 2015/0356225 A1* | 12/2015 | Lu | G06F 30/392 |
| | | | 716/55 |
| 2016/0117431 A1* | 4/2016 | Kim | H01L 27/11807 |
| | | | 716/119 |
| 2016/0233159 A1* | 8/2016 | Song | H01L 21/76816 |
| 2016/0342726 A1* | 11/2016 | Yuan | H01L 28/00 |
| 2017/0316140 A1* | 11/2017 | Kim | H01L 27/0207 |

OTHER PUBLICATIONS

Final Office Action dated Jun. 11, 2018 from co-pending U.S. Appl. No. 15/200,475.
Office Action dated Apr. 9, 2020 from co-pending U.S. Appl. No. 15/200,475.
Final Office Action dated May 26, 2020 from co-pending U.S. Appl. No. 15/200,475.

* cited by examiner

METHOD, APPARATUS AND SYSTEM FOR WIDE METAL LINE FOR SADP ROUTING

BACKGROUND OF THE INVENTION

Field of the Invention

Generally, the present disclosure relates to the manufacture of sophisticated semiconductor devices, and, more specifically, to various methods and structures for providing wide metal lines for improved standard cells and inter-cell routability for manufacturing semiconductor devices.

Description of the Related Art

The technology explosion in the manufacturing industry has resulted in many new and innovative manufacturing processes. Today's manufacturing processes, particularly semiconductor manufacturing processes, call for a large number of important steps. These process steps are usually vital, and therefore, require a number of inputs that are generally fine-tuned to maintain proper manufacturing control.

The manufacture of semiconductor devices requires a number of discrete process steps to create a packaged semiconductor device from raw semiconductor material. The various processes, from the initial growth of the semiconductor material, the slicing of the semiconductor crystal into individual wafers, the fabrication stages (etching, doping, ion implanting, or the like), to the packaging and final testing of the completed device, are so different from one another and specialized that the processes may be performed in different manufacturing locations that contain different control schemes.

Generally, a set of processing steps is performed on a group of semiconductor wafers, sometimes referred to as a lot, using semiconductor-manufacturing tools, such as exposure tool or a stepper. As an example, an etch process may be performed on the semiconductor wafers to shape objects on the semiconductor wafer, such as polysilicon lines, each of which may function as a gate electrode for a transistor. As another example, a plurality of metal lines, e.g., aluminum or copper, may be formed that serve as conductive lines that connect one conductive region on the semiconductor wafer to another.

In this manner, integrated circuit chips may be fabricated. In some cases, integrated circuit or chips may comprise various devices that work together based upon a hard-coded program. For example, application-specific integrated circuit (ASIC) chips may use a hard-coded program for various operations, e.g., boot up and configuration processes. The program code, in the form of binary data, is hard-coded into the integrated circuit chips.

When designing a layout of various devices with an integrated circuits (e.g., CMOS logic architecture), designers often select pre-designed functional cells comprising various features (e.g., diffusion regions, transistors, metal lines, vias, etc.) and place them strategically to provide an active area of an integrated circuit. One challenge of designing a layout is accommodating ever-increasing density of cell components and still maintain routability for connecting various components of the cells. This is increasingly a challenge as dimensions of these components get smaller, such as for 10 nm node or lower integrated circuit designs.

The pre-designed functional cells are often used to design transistors, such as metal oxide field effect transistors (MOSFETs or FETs). A FET is a device that typically includes a source region, a drain region, a channel region that is positioned between the source region and the drain region, and a gate electrode positioned above the channel region. Current flow through the FET is controlled by controlling the voltage applied to the gate electrode. If a voltage that is less than the threshold voltage of the device is applied to the gate electrode, then there is no current flow through the device (ignoring undesirable leakage currents, which are relatively small). However, when a voltage that is equal to or greater than the threshold voltage of the device is applied to the gate electrode, the channel region becomes conductive, and electrical current is permitted to flow between the source region and the drain region through the conductive channel region.

To improve the operating speed of FETs, and to increase the density of FETs on an integrated circuit device, device designers have greatly reduced the physical size of FETs over the years. More specifically, the channel length of FETs has been significantly decreased, which has resulted in improving the switching speed of FETs. However, decreasing the channel length of a FET also decreases the distance between the source region and the drain region. In some cases, this decrease in the separation between the source and the drain makes it difficult to efficiently inhibit the electrical potential of the channel from being adversely affected by the electrical potential of the drain. This is sometimes referred to as a so-called short channel effect, wherein the characteristic of the FET as an active switch is degraded.

There are essentially two types of FETs: planar FETs and so-called 3D devices, such as an illustrative finFET device, which is a 3-dimensional structure. More specifically, in a finFET, a generally vertically positioned, fin-shaped active area is formed and a gate electrode encloses both of the sides and the upper surface of the fin-shaped active area to form a trigate structure so as to use a channel having a 3-dimensional structure instead of a planar structure. In some cases, an insulating cap layer, e.g., silicon nitride, is positioned at the top of the fin and the finFET device only has a dual-gate structure.

FinFET designs use "fins" that may be formed on the surface of a semiconductor wafer using selective-etching processes. The fins may be used to form a raised channel between the gate and the source and drain of a transistor. The gate is then deposited such that it wraps around the fin to form a trigate structure. Since the channel is extremely thin, the gate would generally have a greater control over the carriers within. However, when the transistor is switched on, the shape of the channel may limit the current flow. Therefore, multiple fins may be used in parallel to provide greater current flow for increased drive strength.

FIG. 1 illustrates a stylized cross-sectional depiction of a state-of-the-art finFET device. A finFET device 100 illustrated in FIG. 1 comprises a plurality of "fins" 110. The semiconductor device may be position to a vertical orientation, creating one or more fins 110. The source and drain of the finFET are placed horizontally along the fin. A high-k metal gate 120 wraps over the fin, covering it on three sides. The gate 120 defines the length of the finFET device. The current flow occurs along an orthogonal crystal plane in a direction parallel to the plane of the semiconductor wafer. The electrically significant height of the fin (labeled H) is typically determined by the amount of oxide recess in the fin reveal step and hence is constant for all fins 110.

The thickness of the fin (labeled $T_{fi}$) determines the short channel behavior of the transistor device and is usually small in comparison with the height H of the fin 110. The pitch (labeled P) of the fins is determined by lithographic constraints and dictates the wafer area to implement the desired device width. A small value of the pitch P and a large value of the height H enable a better packing of the devices per square area resulting in a denser design, or more efficient use of silicon wafer area.

The scaling down of integrated circuits coupled with higher performance requirements for these circuits have prompted an increased interest in finFETs. FinFETs generally have the increased channel widths, which includes channel portions formed on the sidewalls and top portions of the fins. Since drive currents of the finFETs are proportional to the channel widths, finFETs generally display increase drive current capabilities.

The ultimate goal in integrated circuit fabrication is to accurately reproduce the original circuit design on integrated circuit products. Historically, the feature sizes and pitches employed in integrated circuit products were such that a desired pattern could be formed using a single patterned photoresist masking layer. However, in recent years, device dimensions and pitches have been reduced to the point where existing photolithography tools, e.g., 193 nm wavelength immersion photolithography tools, cannot form a single patterned mask layer with all of the features of the overall target pattern. Accordingly, device designers have resorted to techniques that involve performing multiple exposures to define a single target pattern in a layer of material. One such technique is generally referred to as multiple patterning, e.g., double patterning. Generally speaking, double patterning is an exposure method that involves splitting (i.e., dividing or separating) a dense overall target circuit pattern into two separate, less-dense patterns. The simplified, less-dense patterns are then printed separately on a wafer utilizing two separate masks (where one of the masks is utilized to image one of the less-dense patterns, and the other mask is utilized to image the other less-dense pattern). Further, in some cases, the second pattern is printed in between the lines of the first pattern such that the imaged wafer has, for example, a feature pitch which is half that found on either of the two less-dense masks. This technique effectively lowers the complexity of the photolithography process, improving the achievable resolution and enabling the printing of far smaller features than would otherwise be impossible using existing photolithography tools.

The Self-Aligned-Double-Patterning (SADP) process is one such multiple patterning technique. The SADP process may be an attractive solution for manufacturing next-generation devices, particularly metal routing lines on such next-generation devices, due to better overlay control that is possible when using an SADP process. In SADP processes, metal features that are defined by mandrel patterns are referred to as "mandrel metal," while metal feature that are not defined by mandrel patterns are called "non-mandrel metal." Further, SADP processes generally have a high tolerance for overlay errors. Therefore, SADP processes have been increasingly adopted for metal formation in higher resolution designs, such as 14 nm and 10 nm designs. To use double patterning techniques, an overall target pattern must be what is referred to as double-patterning-compliant. In general, this means that an overall target pattern is capable of being decomposed into two separate patterns that each may be printed in a single layer using existing photolithography tools. Layout designers sometime speak of such patterns with reference to "colors," wherein the first mask will be represented in an EDA tool using a first color and the second mask will be represented in the EDA tool using a second, different color. To the extent a layout is non-double-patterning-complaint, it is sometimes stated to present a "coloring conflict" between the two masks.

Designers often use pre-designed basic cells to form layouts of more complex cells comprising finFET devices. One example of a typical pre-designed functional cell is illustrated in FIG. 2. FIG. 2 illustrates a typical standard cell 200 for a 10 nm node design. Since there is a strong industry demand for dense standard cell library, designers have implemented cell libraries of less than 9-tracks (9T), such as 10 nm, 8.75 track (T) libraries. The cell 200 is an example of a multi-track 10 nm 8.75T cell, which may comprise a plurality of components that densely populate the cell 200. The cell 200 comprises a plurality of metal pins (230a-230c) (e.g., Metal-1 (M1) metal pins. The cell 200 also includes a "U-shaped" metal interconnection 220. The cell 200 includes a VDD metal formation 250 on a routing track 251, and a VSS metal formation 260 on another routing track 261.

In some examples, the metals pins 230A and 230B may be input pins, while the metal pin 230C may be output pins. Further, the cell 200 also includes a plurality of vertical semiconductor formations 270, e.g., gate formations for a transistor. A plurality of pin hit points 275 provides for routing of M2 metal formations. At the boundary of the cell 200, the metal VDD line 250 and the metal VSS line 260 are defined.

The cell 200 comprises a plurality of M2 tracks, including an M2 bottom edge track 240a, an M2 top edge track 240i, and a plurality of inside M2 tracks 240b-240h (collectively "240"). The inside M2 tracks 240b-240h are spaced 48 nm apart. The M2 edge track 240a is about 90 nm from the inside M2 track 240b, wherein the M2 edge track 240i is about 90 nm from the inside M2 track 240h. In light of the VDD line 250, the VSS line 260, the output pins 230C, the utilization of metal-2 layer (M2) tracks 240 to connect the various pins 230A-230B can cause the cell 200 to become very difficult to connect. This causes routing-congestion and causes the routing task to be more difficult.

With regard to finFET technology, the cell height is generally preferred to be associated with the fin pitch that often results in non-integer or non-half integer number of metal pitches, e.g., 8.75T libraries in 10 nm node. Generally, uniform fin pitch is preferable to uniform metal pitch. Thus, the cell height has to generally confirm to a uniform standard based upon the fin pitch. For example, the cell height of a 10 nm node 8.75T cell would be 8.75 multiplied by 48 nm metal pitch, which is 420 nm. For ten fins, the fin pitch would be 420 nm divided by 10 fins, which is 42 nm. One design restriction that is caused by SADP process is that it cannot support arbitrary metal wire length.

FIG. 3 illustrates a typical, stylized and simplified depiction of a portion of SADP route design 300 having mandrel and non-mandrel metal lines. The tracks in the cell portion 300 are pre-colored to provide alternating non-mandrel and mandrel colors. Based on the pre-colored tracks, a plurality of alternative non-mandrel M2 metal lines (310) and mandrel M2 metal lines (320) are formed. The cell portion 300 has an M2 metal pitch of 48 nm. FIG. 3 also shows a wide mandrel metal line (330) with a width of 24×5, or 120 nm width (i.e., "5× metal").

There are various reasons for providing wide signal lines. For example, power structures, clock tree signal structures, high-drive current signals, etc., would benefit from wide signal lines. State-of-the-art wide lines call 5× metal lines, as shown in FIG. 3. Generally, in the state-of-the-art, metal line widths between 24 nm and 120 nm are disallowed as design rule violations. Therefore, in instances where wide lines are desired, 5× width metal lines are used. One of the problems associated with 5× metal lines is that they utilize three route tracks, which is costly and inefficient. Further, 5× wide metal lines are generally not compatible with color design rules, where each track is pre-colored. Further, it would be desirable to provide increased routing resources to efficiently route ever-increasing congestion of pre-defined cells. Therefore, as described above, there are various inefficiencies, errors, and other problems associated with the state-of-art.

The present disclosure may address and/or at least reduce one or more of the problems identified above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Generally, the present disclosure is directed to various methods, apparatus and system for a circuit layout for an integrated circuit device comprising a plurality of wider-than-default metal formations for a functional cell. A design for an integrated circuit device is received. The design comprises at least one functional cell. A first pair of wide metal formations are provided. The first pair of wide metal formations comprise a first metal formation and a second metal placed about a first cell boundary of the functional cell for providing additional space for routing, for high-drive routing, and/or for power routing.

BRIEF DESCRIPTION OF THE DRAWINGS

The disclosure may be understood by reference to the following description taken in conjunction with the accompanying drawings, in which like reference numerals identify like elements, and in which.

Figure 1:
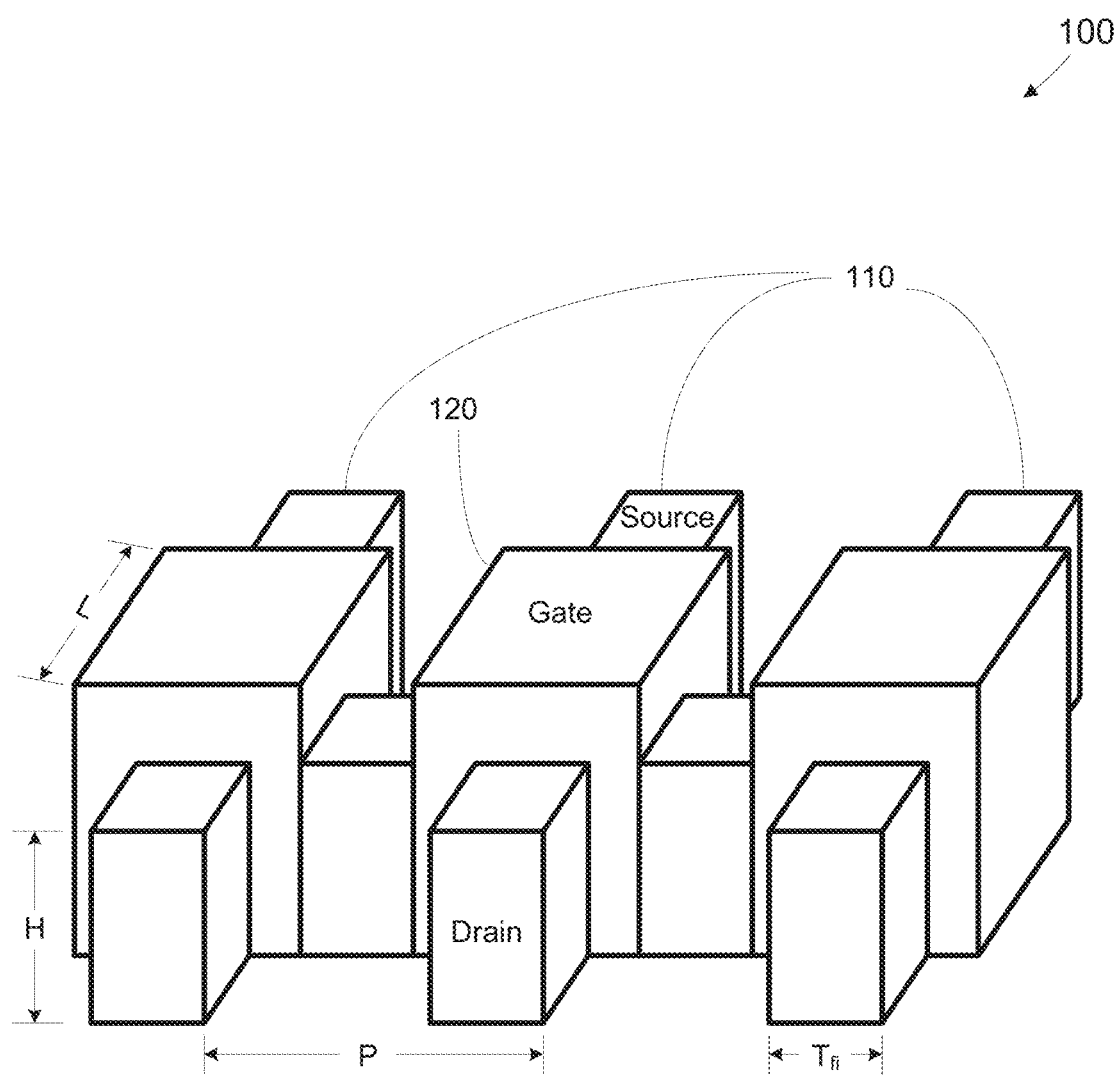
FIG. 1 illustrates a stylized cross-sectional depiction of a state-of-the-art finFET device.
Figure 2:
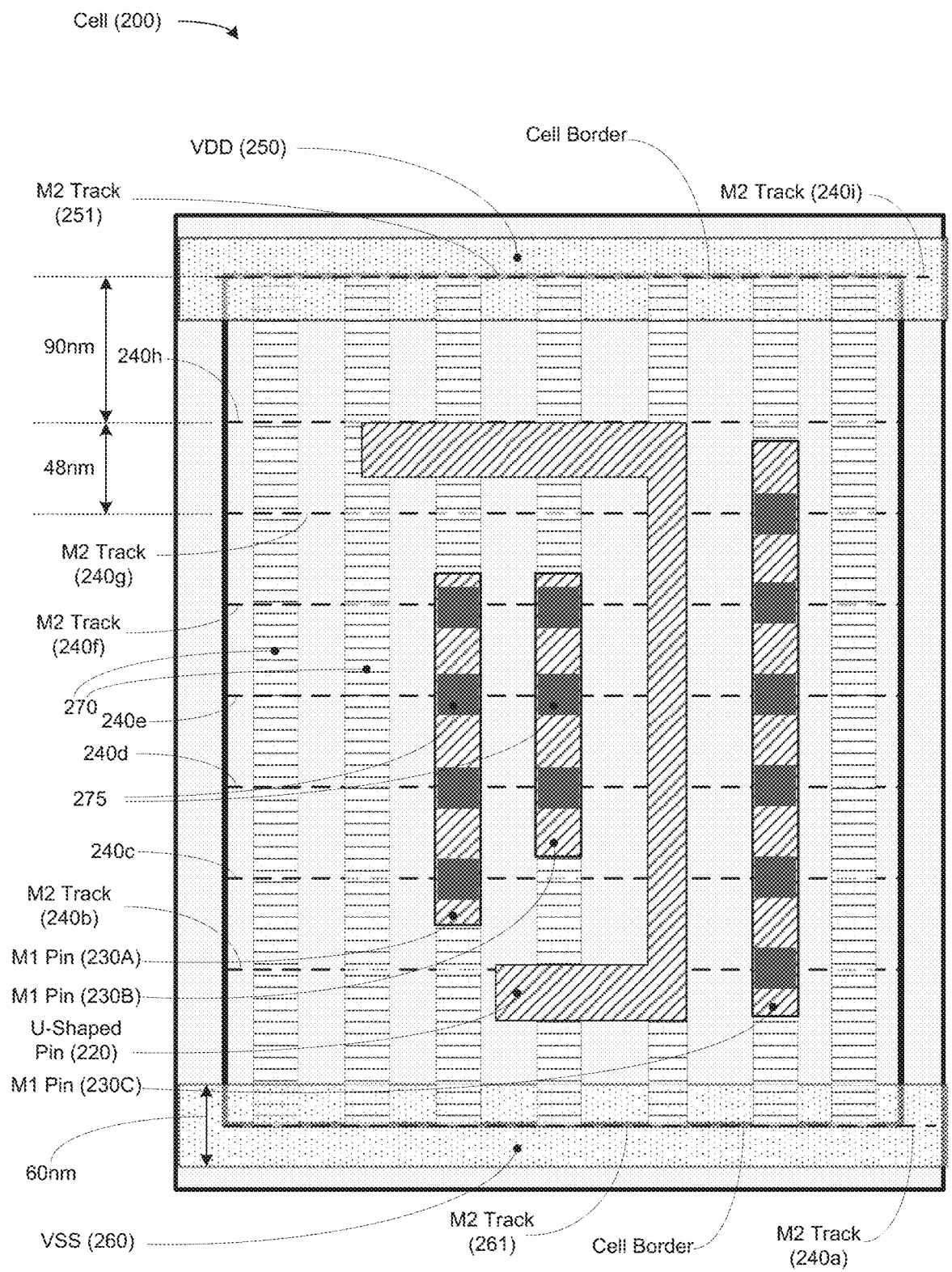
FIG. 2 illustrates a stylized depiction of a typical standard cell for a 10 nm node design.
Figure 3:
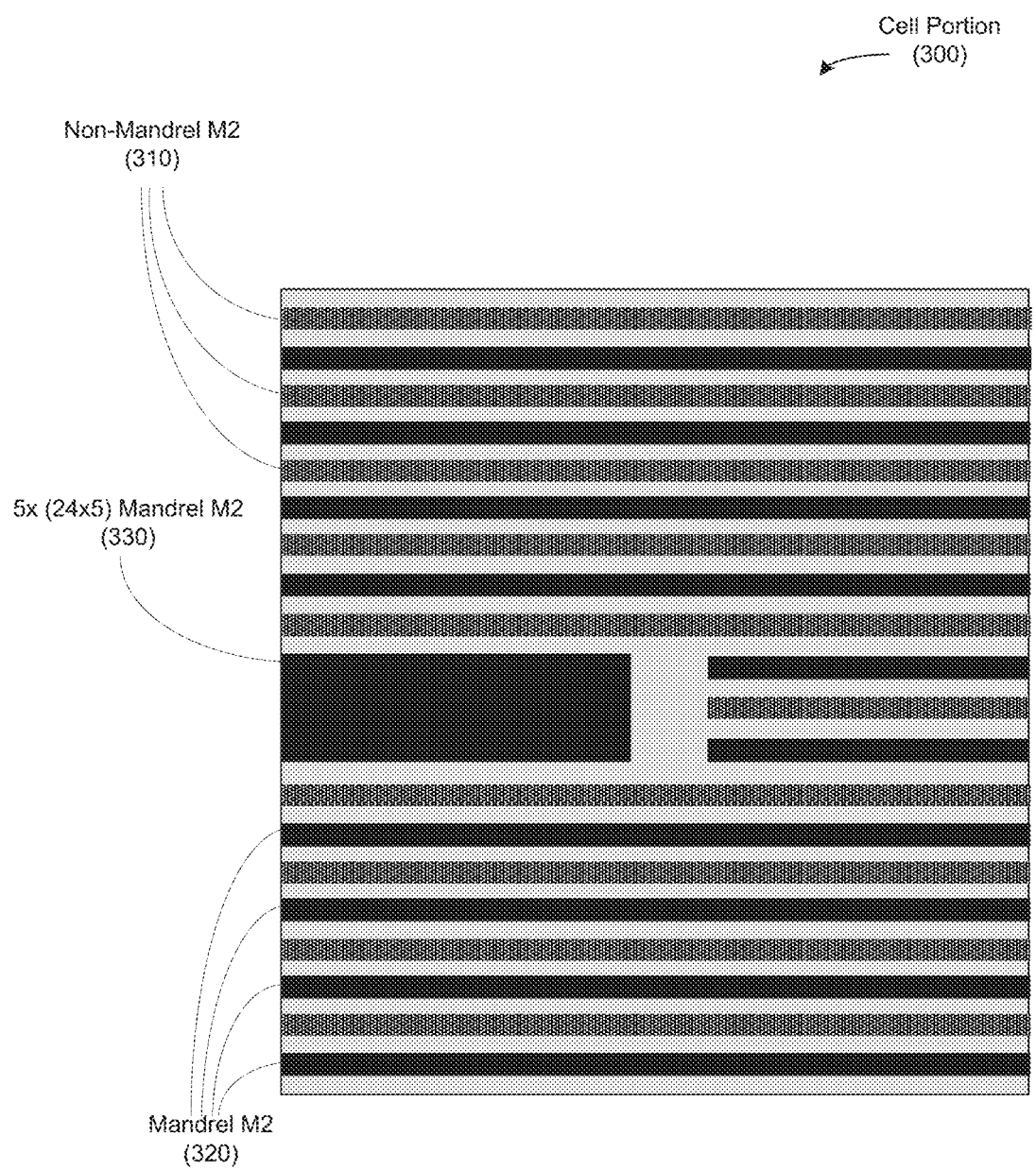
FIG. 3 illustrates a stylized, simplified depiction of a portion of a SADP route design 300 having mandrel and non-mandrel metal lines.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Embodiments herein provide for performing a standard cell design improvement for increasing routing efficiency. Embodiments herein provide for defining metal formations (e.g., M2 metal formation) that are wider-than-default metal formations (e.g., greater than 24 nm, such as 40 nm) and less than 5× formations, using wide routing tracks on the top and bottom portions of a cell. As a non-limiting example, for a 10 nm, 8.75T standard cell library, two wide metal formations (e.g., M2 formations) having width in the range of about 24 nm and 120 nm may be provided at the top boundary and bottom boundary of a cell.

Further, embodiments herein provide for utilizing metal lines that are wider-than-default metal formations (e.g., M2 metal formations) to provide an interconnection between cells. For example, the wider-than-default metal formations provided in embodiments herein may be used for connection where a wider metal line may be beneficial, e.g., for power signal lines, clock tree signals, high-drive current signals, etc.

Figure 4:
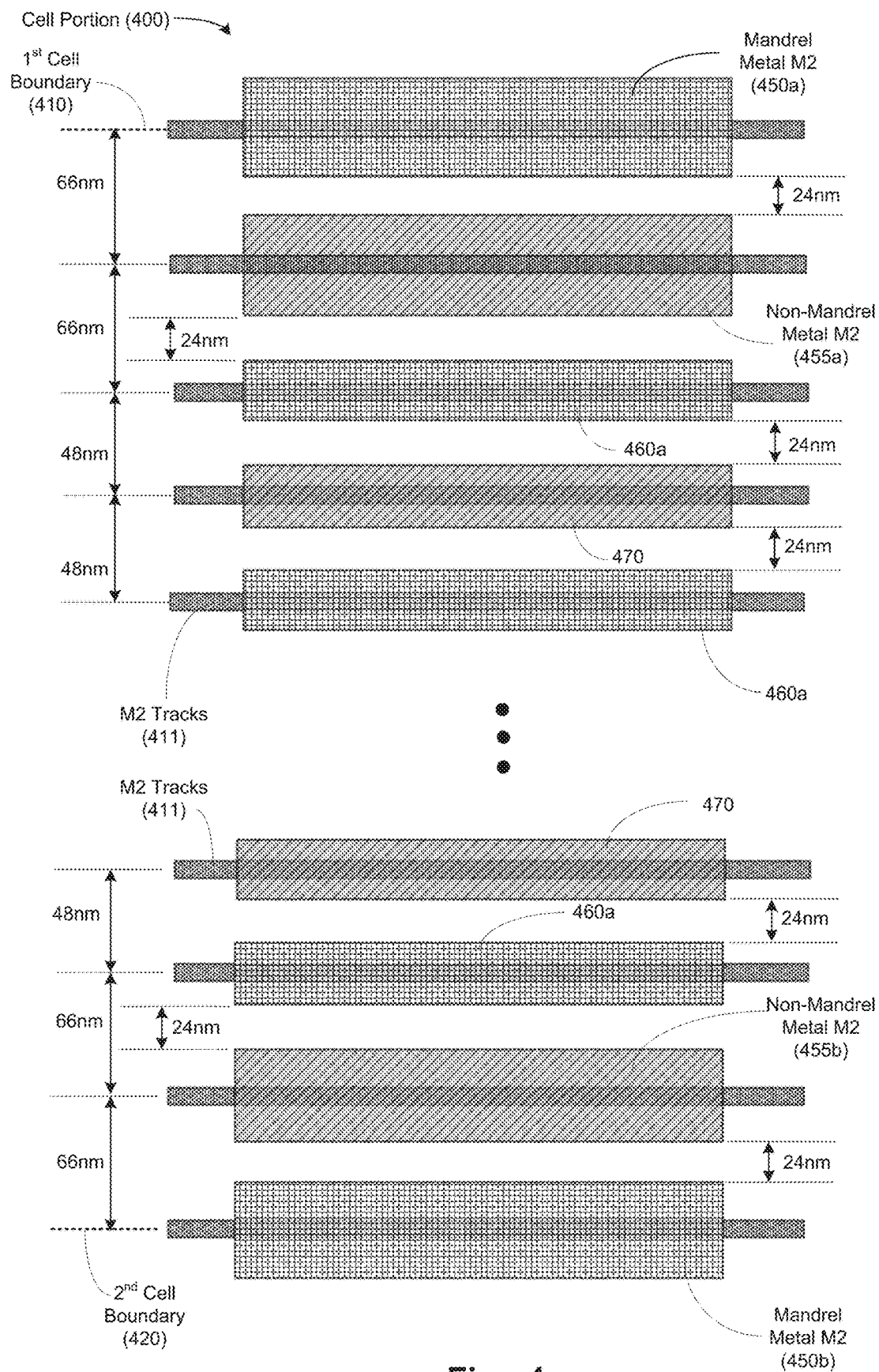
FIG. 4 illustrates a stylized, simplified depiction of a portion of a cell having mandrel and non-mandrel metal lines in accordance with embodiments herein.

Turning now to FIG. 4, a stylized, simplified depiction of a portion of a cell having mandrel and non-mandrel metal lines in accordance with embodiments herein, is illustrated. The cell 400 of FIG. 4 may be pre-colored to provide alternating non-mandrel and mandrel color metal formation. The VDD and VSS power rails of a cell 400 are symmetrically positioned about the cell boundary tracks 410, 412, respectively. At the cell boundary 410, the cell 400 comprises two wider-than-default metal formations (e.g., M2 metal formations): a mandrel M2 feature 450a, and a non-mandrel M2 feature 455a. Similarly, at the cell boundary 412, the cell 400 comprises two wider-than-default metal formations (e.g., M2 metal formations): a mandrel M2 feature 450b, and a non-mandrel M2 feature 455b. The M2 features 450a, 450b, 455a, 455b are wider than the default metal width (e.g., 24 nm for 10 nm, 8.75T cells) but less-wide than the default wide, 5× metal features (e.g., 120 nm for 10 nm, 8.75T cells).

In one embodiment, the widths of the M2 features 450a, 450b, 455a, 455b are 42 nm in a 10 nm, 8.75T standard cell. The distances between the M2 features 450a, 450b, 455a, 455b may be 24 nm on 48 nm metal tracks. In one embodiment, the tracks (e.g., M2 tracks) 411 may be pre-colored tracks such that metal features of alternating colors may be formed on the tracks 411 between the M2 features 450a, 450b, 455a, 455b. These tracks may comprise 24 nm default width mandrel metal features 460a, 460b, alternating with non-mandrel metal features 470. The widths of the M2 features 450a, 450b, 455a, 455b may be strategically selected such that they are color compatible to the pre-colored tracks 411 and fit within the dimensions of the standard cell 400.

The width of the M2 features 450a, 450b, 455a, 455b may be adjustable, and may depend on the amount of width required for the power rails, the standard track widths, the width of the standard metal formation, the space needed to generate the additional route track, the overlap distance between the offset M2 power rail and M1 power rail to form via connections, and/or the like. In one example, inside cell M2 metal tracks are on default size to improve pin connection and wider-than-default metal tracks are defined on cell boundary to conduct power design, data path and/or high drive connection. In some embodiments, an automated device, software, and/or firmware may automatically adjust the width of the M2 features 450a, 450b, 455a, 455b based upon the design parameters (e.g., 10 nm design, the number of fins, the track pitch, etc.).

Figure 5:
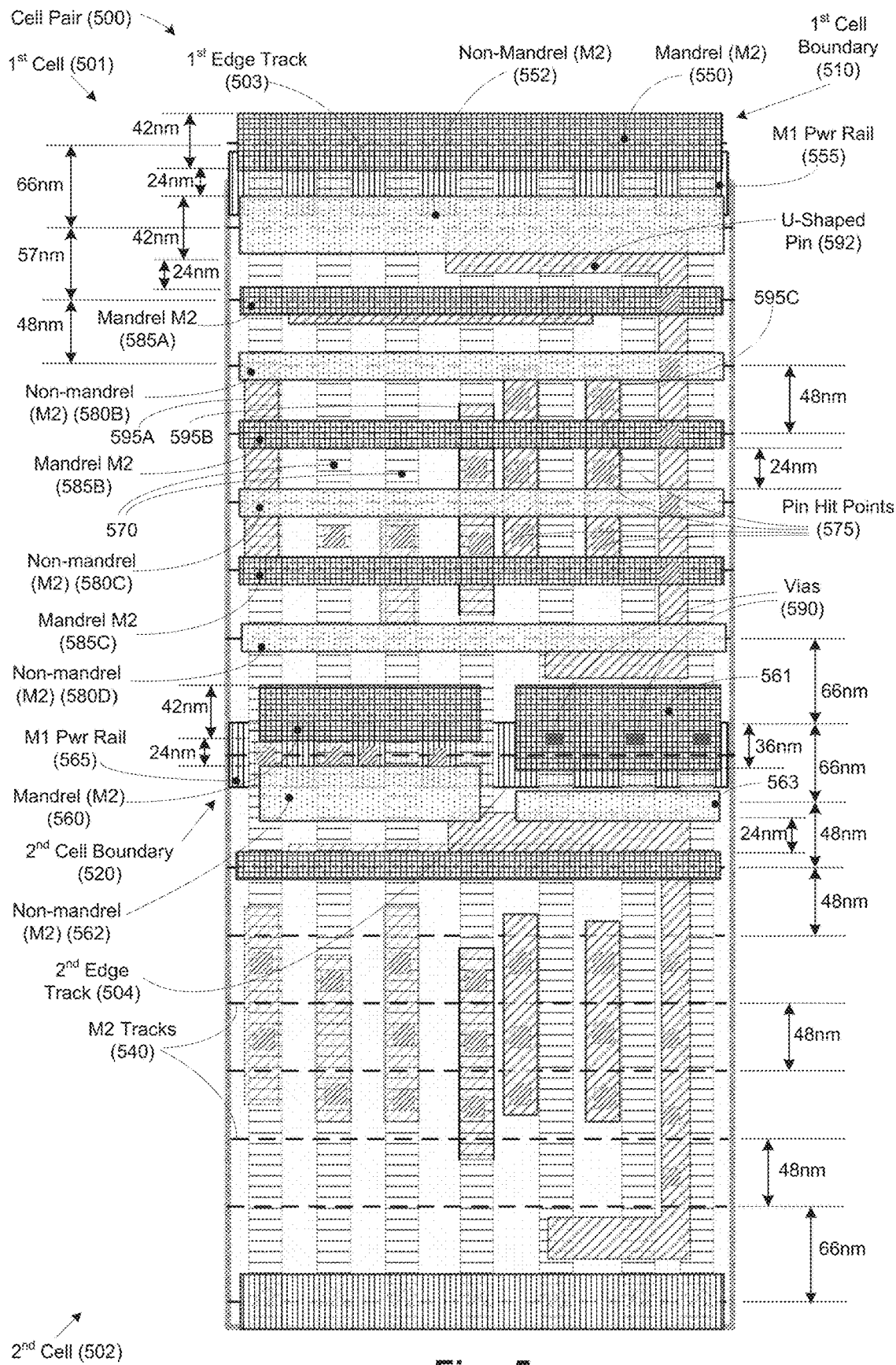
FIG. 5 illustrates a stylized depiction of a cell pair comprising wide metal line pairs in accordance with embodiments herein.

Turning now to FIG. 5, a stylized depiction of a cell pair comprising wide metal line pairs, in accordance with embodiments herein, is illustrated. The cell pair 500 comprises two cells that are grouped together, a $1^{st}$ cell 501 and a $2^{nd}$ cell 502. In one embodiment, the cells 501, 502 are 10 nm, 8.75T cells. In other embodiment, the cells 501, 502 may be of different dimensions with different corresponding routing tracks widths. On one embodiment, on cell 501, there are seven horizontal routing tracks 570 and two edge tracks ($1^{st}$ edge track 503 and $2^{nd}$ edge track 504), on which alternative mandrel and non-mandrel metal formations may be formed. Those skilled in the art would appreciate that the features shown in the drawings here are not drawn to scale.

The cell 501 comprises wider-than-default metal lines, offset about the centered on the cell boundaries. In one embodiment, these wider-than-default metal lines are greater than the default metal lines (e.g., 24 nm) and smaller than the 5× (e.g., 120 nm) wide metal lines, wherein the two wider-than-metal lines may be used as power lines, clock tree lines, high-drive current buffer lines, etc. Even though FIG. 5 is described in terms of M2 metal lines, the concepts provided by embodiments herein may also be applied to other metal layers.

In some examples, the metals pins 595A and 595B in the $1^{st}$ cell 501 may be input pins, while the metal pin 595C may be output pins. Further, the cell 501 may also include a plurality of vertical semiconductor formations 570, e.g., gate formations for a transistor. A plurality of pin hit points 575 provides for routing of M2 metal formations.

At the top cell boundary of the $1^{st}$ cell 501, a wider-than-default mandrel M2 metal formation (550) may be defined. The mandrel M2 formation 550 may be formed offset from the center of an M1 power rail 555. Similarly, a wider-than-default, non-mandrel M2 metal formation (552) may also be formed offset to the M2 power rail 555. The M2 metal formations 550, 552 may be wider-than-default metal formations, e.g., 42 nm in a 10 nm, 8.75T functional cell library.

At the bottom cell boundary of the $1^{st}$ cell 601, a mandrel M2 metal formation (560) is defined offset to an M1 power rail 665. Similarly, a non-mandrel M2 metal formation (562) is formed offset to the M1 power rail 665. The M2 metal formations 560, 562 may be wider-than-default metal formations, e.g., 42 nm in a 10 nm, 8.75T functional cell library.

Further, at the bottom cell boundary of the $1^{st}$ cell 501, an even wider mandrel M2 metal formation 561 may be formed. Below the metal formation 561, a non-mandrel M2 metal formation of a smaller width, e.g., default width, may be formed. In one embodiment, the M2 metal formation 561 may be coupled to the VDD M1 power rail 565 using vias 590. There must be a minimum overlap between the M1 power rail 565 and the M2 formation 561 in order to allow for vias 590 to interconnect the power rail 565 to the M2 formation 561, thereby providing M2 power taps.

The mandrel M2 metal formation 550 is followed by a non-mandrel metal formation (e.g., 42 nm) 552, followed by a standard mandrel metal 585A on the next track 570, followed by a non-mandrel metal 580B, followed by a mandrel M2 metal 585B, followed by a non-mandrel M2 metal 580C, followed by a mandrel M2 metal 585C, followed by a non-mandrel M2 metal 585D on a subsequent track 540, and finally, on the $2^{nd}$ edge track 504, the wider-than-default mandrel M2 metal features 560, 561, which is defined asymmetrically about the bottom boundary, above a M1 power rail 565. The M2 features 585A, 595A, 585B, 595B, 580C, 585C, and 580D are default-width features that are formed on inside tracks that have default-width spacing (e.g., 48 nm apart). The M1 features 550, 552, 560, 561 and 562 are wider-than-default features are formed on wider-than-default M2 metal tracks (e.g., 66 nm apart) and are formed adjacent to the default-width features formed on inside tracks. Below the M2 metal features 560, 561, on the next M2 track, the wider-than-default non-mandrel M2 metal 562 is defined, and then alternating mandrel and non-mandrel metal formations may be defined. In this manner, mandrel and non-mandrel M2 metal formations are alternated on the M2 tracks 540 and on the cell boundaries in order to avoid color mismatch errors, while provide for wider metal features at the top and bottom edges of the $1^{st}$ cell 501.

The mandrel M2 metal feature 550 is formed symmetrically about the $1^{st}$ edge track 503, while the non-mandrel M2 metal feature 562 is formed symmetrically about the $2^{nd}$ edge track. In the example illustrated in FIG. 5, the distances between the $1^{st}$ edge track 503 and the next two adjacent M2 tracks 540 are 66 nm, wherein subsequent M2 tracks are 48 nm apart. Similarly, the $2^{nd}$ edge track 504 is 57 nm from the next adjacent M2 track 540. Moreover, the standard metal formations are 24 nm wide and the wider-than-default metal formations (i.e., 550, 560) may be between 24 nm and 120 nm wide. Those skilled in the art would appreciate that these dimensions are exemplary and they apply to 10 nm, 8.75T design. However, other dimensions for the components illustrated in FIG. 5 may be applied and still remain within the spirit and scope of the embodiments and claims provided herein.

Embodiments disclosed herein comprise default M2 metal tracks inside a function cell to increase pin accessibility, and wider-than-default M2 metal tracks on the cell edge designated for power design, and/or high drive connection. Embodiments disclosed herein may be implemented in finFET mandrel designs as well as for lithography-etch-lithography-etch (LELE) metal designs.

Figure 6:
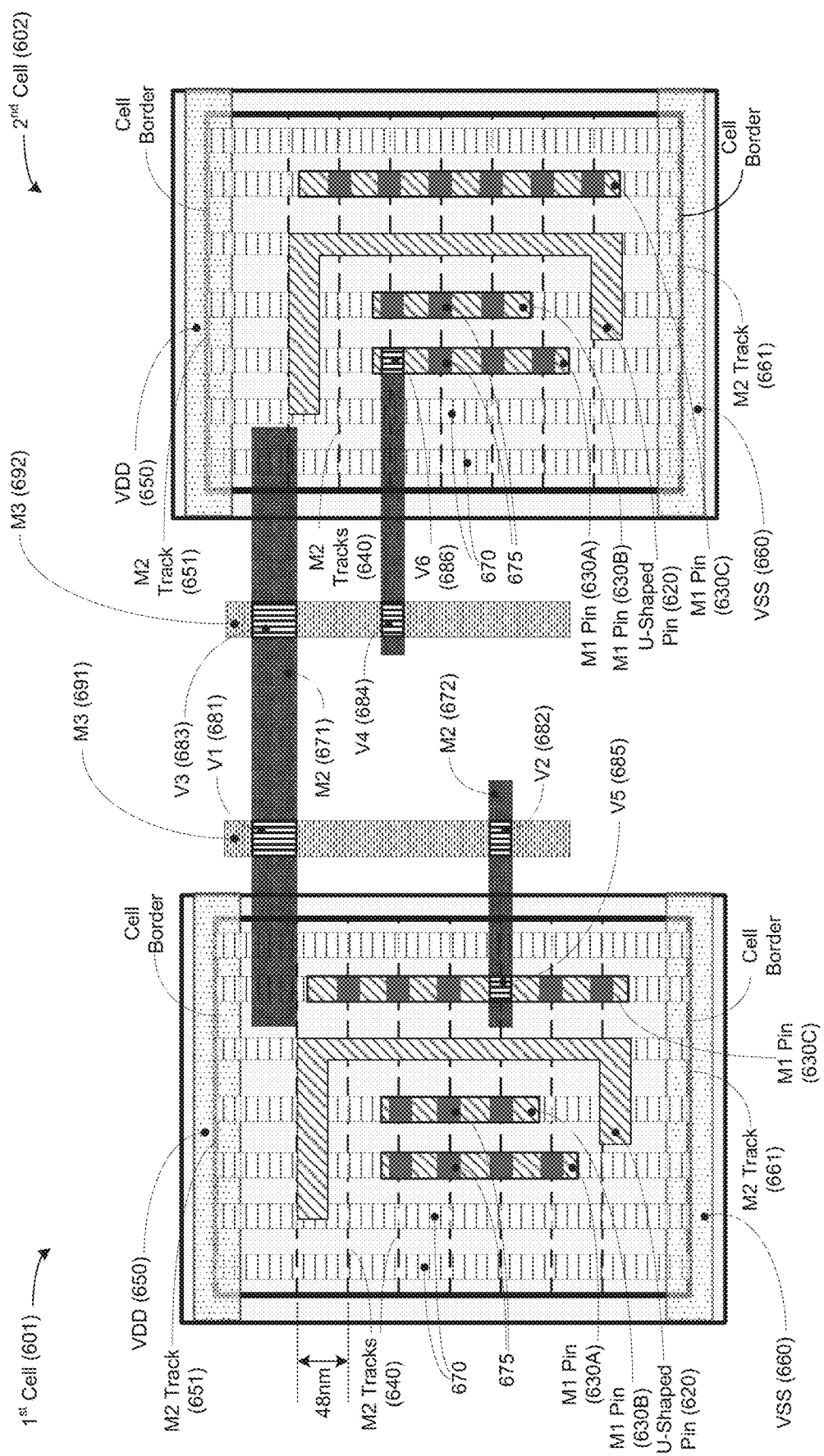
FIG. 6 illustrates a stylized depiction of an interconnection between two cells, in accordance with embodiments herein.

Turning now to FIG. 6, a stylized depiction of an interconnection between two cells, in accordance with embodiments herein is illustrated. The circuit of FIG. 6 may comprise a $1^{st}$ cell 601 and a $2^{nd}$ cell 602 that are interconnected by metal lines. In one embodiment, the cells 601, 602 are multi-track 10 nm, 8.75T cell, which may comprise a plurality of components that densely populate the cells 601, 602. Each of the cells 601, 602 comprise a plurality of metal pins (230a-230c) (e.g., Metal-1 (M1)) metal pins. The metal pins 630A and 630B are input pins and 630C is output pin. Each of the cells 601, 602 also comprise a "U-shaped" interconnection 620. Each of the cells 601, 602 comprise a VDD metal formation 650 on a routing track 651, and a VSS metal formation 660 on another routing track 661.

In some embodiments, the metals pins 630A and 630B of each of the cells 601, 602 may be input pins, while the metal pin 630C may be output pins. Further, the cell 600 also includes a plurality of vertical semiconductor formations 670, e.g., gate formations for a transistor. A plurality of pin hit points 675 provides for routing of M2 metal formations. At the boundary of the cell 600, the metal VDD line 650 and the metal VSS line 660 are defined.

In one embodiment, a decision may be is made as to whether one or more wide-metal lines are required for interconnecting one or more standard cells in an integrated circuit. For example, a determination may be made that certain metal power lines, high-drive signal lines, clock-tree synthesis lines long routes, and/or the like, may be required for a forming a particular integrated circuit design. Upon a determination that one or more wider-than-default lines are required, a determination is made as to the particular width that of those metal lines. Performing this determination may include considerations of various factors, including the area available for integrated circuit, design considerations regarding wide metal lines within a standard cell, etc.

In one embodiment, the interconnection between the cells 601, 602 may be provided by forming a long, wide M2 metal line 671. The M2 metal line 671 is a wider-than-default metal routing line, e.g., between 24 nm and 120 nm in an 8.75T cell. The M2 metal line 671 may be coupled to a vertical M3 metal line 691 using a $1^{st}$ via (V1) 681. Another M2 metal line 672 may be connected to the $1^{st}$ cell 601. Further, the M2 metal line 672 may also be coupled to the vertical M3 metal line using a $2^{nd}$ via (V2) 682. The M2 metal line 672 may be coupled to the $1^{st}$ cell 601 using a $5^{th}$ via (V5) 685. In this manner, a portion of the $1^{st}$ cell 601 is coupled to the wide M2 feature 671, which may be routed to one or more locations on an integrated circuit.

The M2 metal line 671 may also be coupled to another vertical M3 metal line 692 using a $2^{nd}$ via (V3) 683. Similarly, another M2 metal line 672 may also be coupled to the vertical M3 metal line 692 using a $4^{th}$ via (V4) 684. The M2 metal line 673 may be coupled to the $2^{nd}$ cell 602 using a $6^{th}$ via (V6) 686. In this manner, a portion of the $2^{nd}$ cell 601 is coupled to the wide M2 feature 671, which may be routed to one or more locations on an integrated circuit. Accordingly, the $1^{st}$ and $2^{nd}$ cells are interconnected using the wide M2 metal line 671. Further, in some embodiments, the cells 601, 602 may comprise two wider-than-default metal formations (e.g., M2 metal formations) on the top and bottom portions of the cells 601, 602, similar to the cell described above and in FIG. 5. Embodiments disclosed herein may be implemented in finFET mandrel designs as well as for lithography-etch-lithography-etch (LELE) metal designs.

Figure 7:
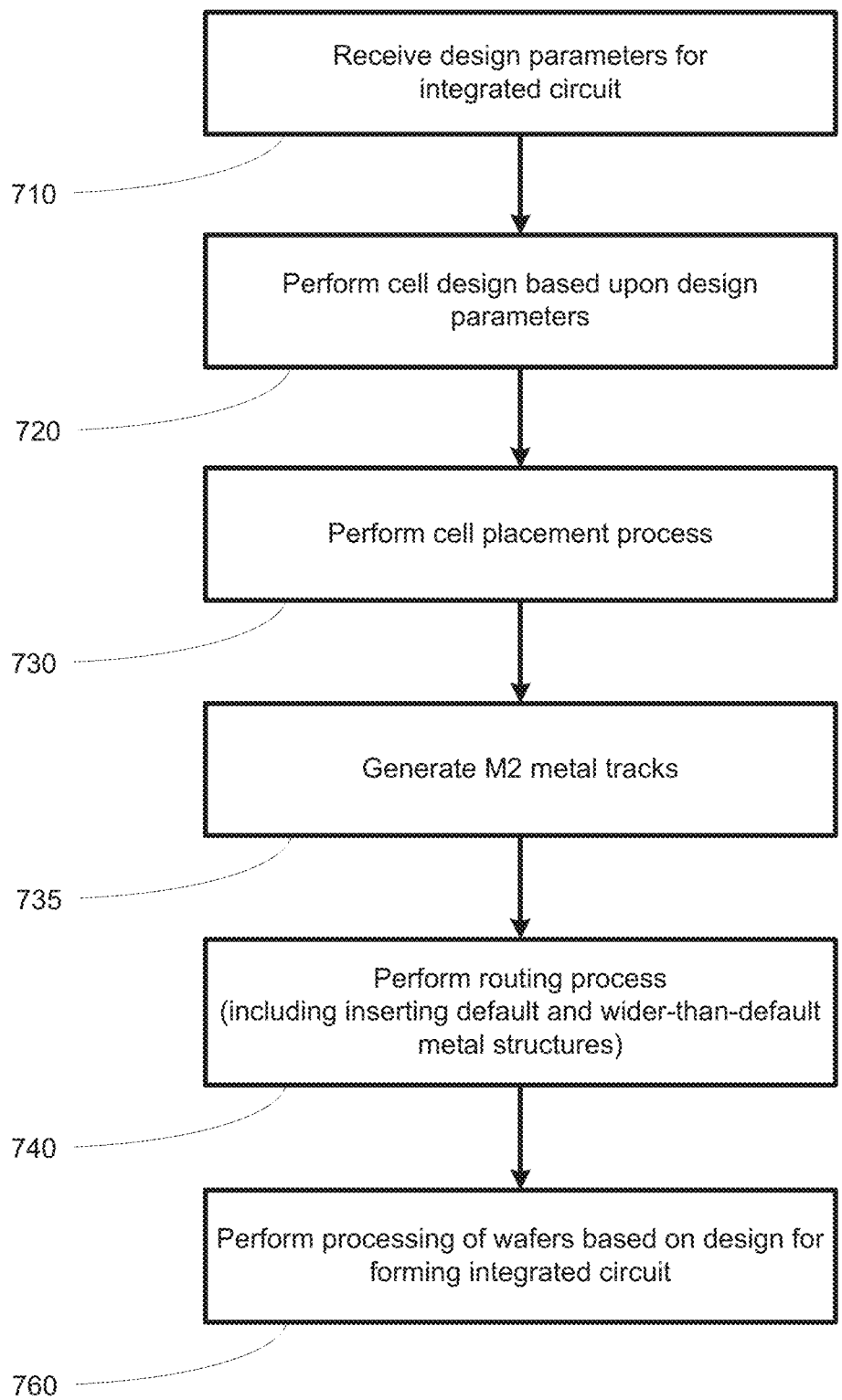
FIG. 7 illustrates a flowchart depiction of a method for providing a design comprising wide metal line pairs, in accordance with embodiments herein.

Turning now to FIG. 7, a flowchart depiction of a method for providing a design comprising wide metal line pairs, in accordance with embodiments herein is provided. A set of design parameters may be received (block 710). The design parameters may comprise various definitions for components (e.g., finFET devices) that are used to form functional cell and/or cell combinations for providing an integrated circuit. Based upon the parameters, one or more function cells may be provided.

In order to design the integrated circuit, a placement process may be performed (block 730). The placement process may include grouping a plurality of functional cells in the manner depicted in FIG. 6. Upon placement of the functional cells, a process of generating default inside M2 metal tracks and wider-than-default M2 metal tracks adjacent to the cell boundary, may be performed (block 735). For example, the M2 metal tracks 540 and the M2 edge tracks 603, 604 (see e.g., FIGS. 5 and 6) may be defined for a 10 nm, 8.75T design. For example, the dual wider-than-default metal formations (i.e., M2 power rail) may be formed on an edge track (see e.g., FIG. 5). As another example, an interconnection routing between cells may be provided to connect two or more cells (see e.g., FIG. 6).

Upon design placement of the functional cells, a routing process may be performed (block 740). The routing process may include generating M2 metal tracks, wider-than default metal formations (e.g., wide M2 formations) may be formed. Further, the width of the wider-than-default metal power rails may be greater than 24 nm (e.g., 40 nm-120 nm). In some embodiments, the wider-than-default metal lines ("wide metal lines") may be formed as alternating color pairs in cells, for example, as illustrated in FIG. 5. In some embodiments, the wider-than-default metal line pairs may be formed on the top portion of a standard cell, and/or on the bottom portion of standard cells. In yet other embodiments, wider-than-default metal lines may be formed for providing interconnections between cells, for example, as illustrated in FIG. 6. In some embodiments, the wider-than-default metal formations are added during the post-placement process of a design process at the block level.

Upon placing the wider-than-default metal formations, a routing process may be performed to route connection to the various components of the functional cells (block 750). Once the placement and routing processes are complete, the processing of semiconductor wafers may be performed based upon the definitions of the function cells (block 760). The process may provide integrated circuit devices that comprise devices (e.g., finFET devices) that comprise increased dense placement and routing of cell components. This may provide for integrated circuitry on wafers that have less process errors, are more dense, and thereby providing for small and more powerful semiconductor devices.

Figure 8:
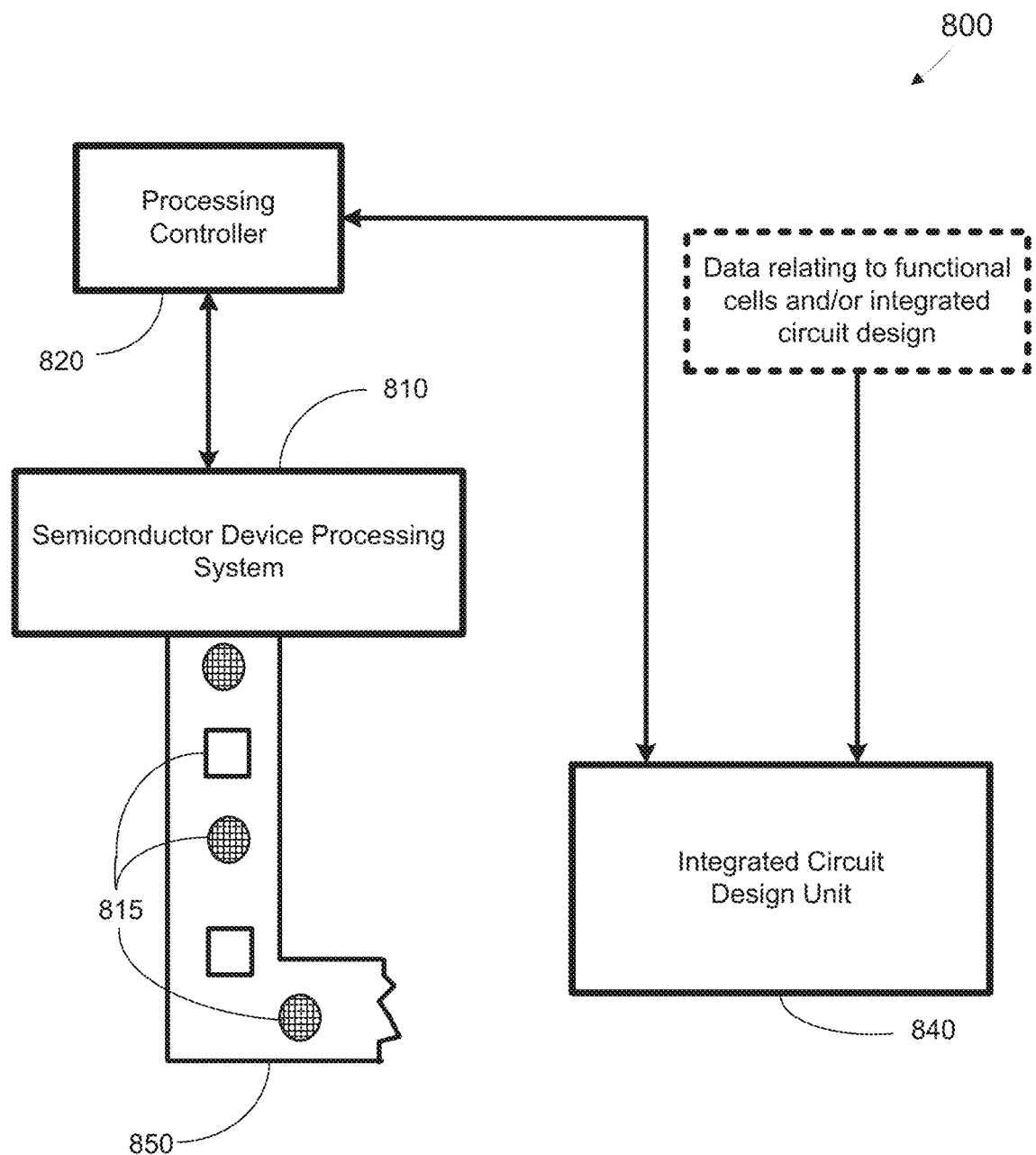
FIG. 8 illustrates semiconductor device processing system for forming an integrated circuit comprising wide metal line pairs, in accordance with some embodiments herein.

Turning now to FIG. 8, a stylized depiction of a system for forming an integrated circuit comprising wide metal line pairs, in accordance with embodiments herein, is illustrated. The system 800 of FIG. 8 may comprise a semiconductor device processing system 810 and a design unit 840. The semiconductor device processing system 810 may manufacture integrated circuit devices based upon one or more designs provided by the design unit 840.

The semiconductor device processing system 810 may comprise various processing stations, such as etch process stations, photolithography process stations, CMP process stations, etc. One or more of the processing steps performed by the processing system 810 may be controlled by the processing controller 820. The processing controller 820 may be a workstation computer, a desktop computer, a laptop computer, a tablet computer, or any other type of computing device comprising one or more software products that are capable of controlling processes, receiving process feedback, receiving test results data, performing learning cycle adjustments, performing process adjustments, etc.

The semiconductor device processing system 810 may produce integrated circuits on a medium, such as silicon wafers. The production of integrated circuits by the device processing system 810 may be based upon the circuit designs provided by the integrated circuits design unit 840. The processing system 810 may provide processed integrated circuits/devices 815 on a transport mechanism 850, such as a conveyor system. In some embodiments, the conveyor system may be sophisticated clean room transport systems that are capable of transporting semiconductor wafers. In one embodiment, the semiconductor device processing system 810 may comprise a plurality of processing steps, e.g., the 1$^{st}$ process step, the 2$^{nd}$ process set, etc., as described above.

In some embodiments, the items labeled "815" may represent individual wafers, and in other embodiments, the items 815 may represent a group of semiconductor wafers, e.g., a "lot" of semiconductor wafers. The integrated circuit or device 815 may be a transistor, a capacitor, a resistor, a memory cell, a processor, and/or the like. In one embodiment, the device 815 is a transistor and the dielectric layer is a gate insulation layer for the transistor.

The integrated circuit design unit 840 of the system 800 is capable of providing a circuit design that may be manufactured by the semiconductor processing system 810. The design unit 840 may receive data relating to the functional cells to utilize, as well as the design specifications for the integrated circuits to be designed. In some embodiments, the integrated circuit design unit 840 may comprise function cell designs that provide for forming wider-than-default metal lines formations at the top and bottom tracks of a functional cell. In some embodiments, the integrated circuit design unit 840 may comprise function cell designs that provide for forming wider-than-default metal lines formations for providing interconnections between functional cells. In some embodiments, the integrated circuit design unit 840 may provide one or more prompts to a user regarding placing asymmetrically arranged, greater-than-default metal formations on cell boundaries, providing for additional routing resources.

In other embodiments, the integrated circuit design unit 840 may perform an automated determination of wider-than-default metal lines and automatically incorporate metal formation on cell combinations that had placement process performed. For example, once a designer or a user of the integrated circuit design unit 840 generates a design using a graphical user interface to communicate with the integrated circuit design unit 840, the unit 840 may perform automated modification of the design using placement of wider-than-default metal formations. In other embodiments, the integrated circuit design unit 840 may be capable of automatically generating one or more wider-than-default metal features for metal formation in cells, or retrieve data regarding parameters relating to wider-than-default metal features from a library.

The system 400 may be capable of performing analysis and manufacturing of various products involving various technologies. For example, the system 800 may design and production data for manufacturing devices of CMOS technology, Flash technology, BiCMOS technology, power devices, memory devices (e.g., DRAM devices), NAND memory devices, and/or various other semiconductor technologies.

The system 800 may be capable of manufacturing and testing various products that include transistors with active and inactive gates involving various technologies. For example, the system 400 may provide for manufacturing and testing products relating to CMOS technology, Flash technology, BiCMOS technology, power devices, memory devices (e.g., DRAM devices), NAND memory devices, processors, and/or various other semiconductor technologies.

The methods described above may be governed by instructions that are stored in a non-transitory computer readable storage medium and that are executed by, e.g., a processor in a computing device. Each of the operations described herein (e.g., FIG. 8) may correspond to instructions stored in a non-transitory computer memory or computer readable storage medium. In various embodiments, the non-transitory computer readable storage medium includes a magnetic or optical disk storage device, solid state storage devices such as flash memory, or other non-volatile memory device or devices. The computer readable instructions stored on the non-transitory computer readable storage medium may be in source code, assembly language code, object code, or other instruction format that is interpreted and/or executable by one or more processors.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is, therefore, evident that the particular embodiments disclosed above may be altered or modified and all such variations are considered within the scope and spirit of the invention. Accordingly, the protection sought herein is as set forth in the claims below.

What is claimed is:

1. An integrated circuit device, comprising:
   at least one functional cell, wherein the functional cell has a default metal line width, and the functional cell comprises:
   a first pair of wide metal formations comprising a first metal formation and a second metal formation placed about a first cell boundary of the functional cell, wherein both the first metal formation and the second metal formation have a width greater than the default metal line width and less than about five times the default metal line width, and the distance between the first metal formation and the second metal formation is equal to the default metal line width.

2. The integrated circuit device of claim 1, wherein the first metal formation comprises a mandrel metal Metal-2 (M2) formation and wherein the second metal formation comprises a non-mandrel metal M2 formation.

3. The integrated circuit device of claim 2, wherein the first and second metal formations are formed on a top edge and a bottom edge of the functional cell.

4. The integrated circuit device of claim 3, wherein the first metal formation is on a top edge of the functional cell and the second metal formations is on a bottom edge of the functional cell.

5. The integrated circuit device of claim 1, further comprising a second pair of wide metal formations comprising a third metal formation and a fourth metal formation placed about a second cell boundary of the functional cell.

6. The integrated circuit device of claim 5, wherein the third metal formation comprises a mandrel metal M2 formation and wherein the fourth metal formation comprises a non-mandrel metal M2 formation.

7. The integrated circuit device of claim 5, wherein the first wide pair is on the first cell boundary and the second wide pair is on the second cell boundary.

8. The integrated circuit device of claim 7, wherein the first and second wide pairs are adapted to route high drive connections.

9. The integrated circuit device of claim 5, wherein the functional cell has at least one 10 nm component and wherein the functional cell has a 8.75 track design.

10. The integrated circuit device of claim 9, wherein:
the first metal formation has a width in the range of about 24 nm to about 120 nm;
the second metal formation has a width in the range of about 24 nm to about 120 nm;
the third metal formation has a width in the range of about 24 nm to about 120 nm; and
the fourth metal formation has a width in the range of about 24 nm to about 120 nm.

11. The integrated circuit device of claim 5, further comprising alternating non-mandrel and mandrel metal formations between the first and second metal pairs.

12. A integrated circuit device, comprising:
at least a first functional cell and a second functional cell, each functional cell having a first pair of wide metal formations comprising a first metal formation and a second metal formation placed about a first cell boundary of the functional cell, wherein both functional cells have a common default metal line width, both the first metal formation and the second metal formation of each functional cell have a width greater than the default metal line width and less than about five times the default metal line width, and the distance between the first metal formation and the second metal formation of each functional cell is equal to the default metal line width; and
a wide M2 metal formation providing an interconnection between the first and second functional cells, wherein the interconnection comprises a first M3 metal formation connected to the M2 metal formation and a portion of the first functional cell and a second M3 metal formation connected to the M2 formation and a portion of the second functional cell.

13. The integrated circuit device of claim 12, wherein:
the first and second functional cells each comprise at least one 10 nm component and a 8.75 track design.

14. The integrated circuit device of claim 12, wherein:
the M2 metal formation has a width in the range of about 24 nm to about 120 nm.

15. The integrated circuit device of claim 12, wherein:
the interconnection comprises a plurality of vias to connect the first and second M3 metal formations to the M2 formation and to the first and second functional cells.

16. An integrated circuit device, comprising:
at least one cell, wherein the cell has a default metal line width, and the cell comprises:
a first pair of wide metal formations comprising a first metal formation and a second metal formation placed about a first cell boundary of the cell, wherein both the first metal formation and the second metal formation have a width greater than the default metal line width and less than about five times the default metal line width, and the distance between the first metal formation and the second metal formation is equal to the default metal line width.

17. The integrated circuit device of claim 16, wherein the first metal formation comprises a mandrel metal Metal-2 (M2) formation and wherein the second metal formation comprises a non-mandrel metal M2 formation.

18. The integrated circuit device of claim 16, wherein the first and second metal formations are formed on a top edge and a bottom edge of the cell.

19. The integrated circuit device of claim 16, wherein the first metal formation is on a top edge of the cell and the second metal formation is on a bottom edge of the cell.

20. The integrated circuit device of claim 16, further comprising a second pair of wide metal formations comprising a third metal formation and a fourth metal formation placed about a second cell boundary of the cell.

* * * * *